Nov. 24, 1959   H. E. BAKER ET AL   2,913,845
FISHING APPARATUS
Filed Feb. 28, 1958   2 Sheets-Sheet 1
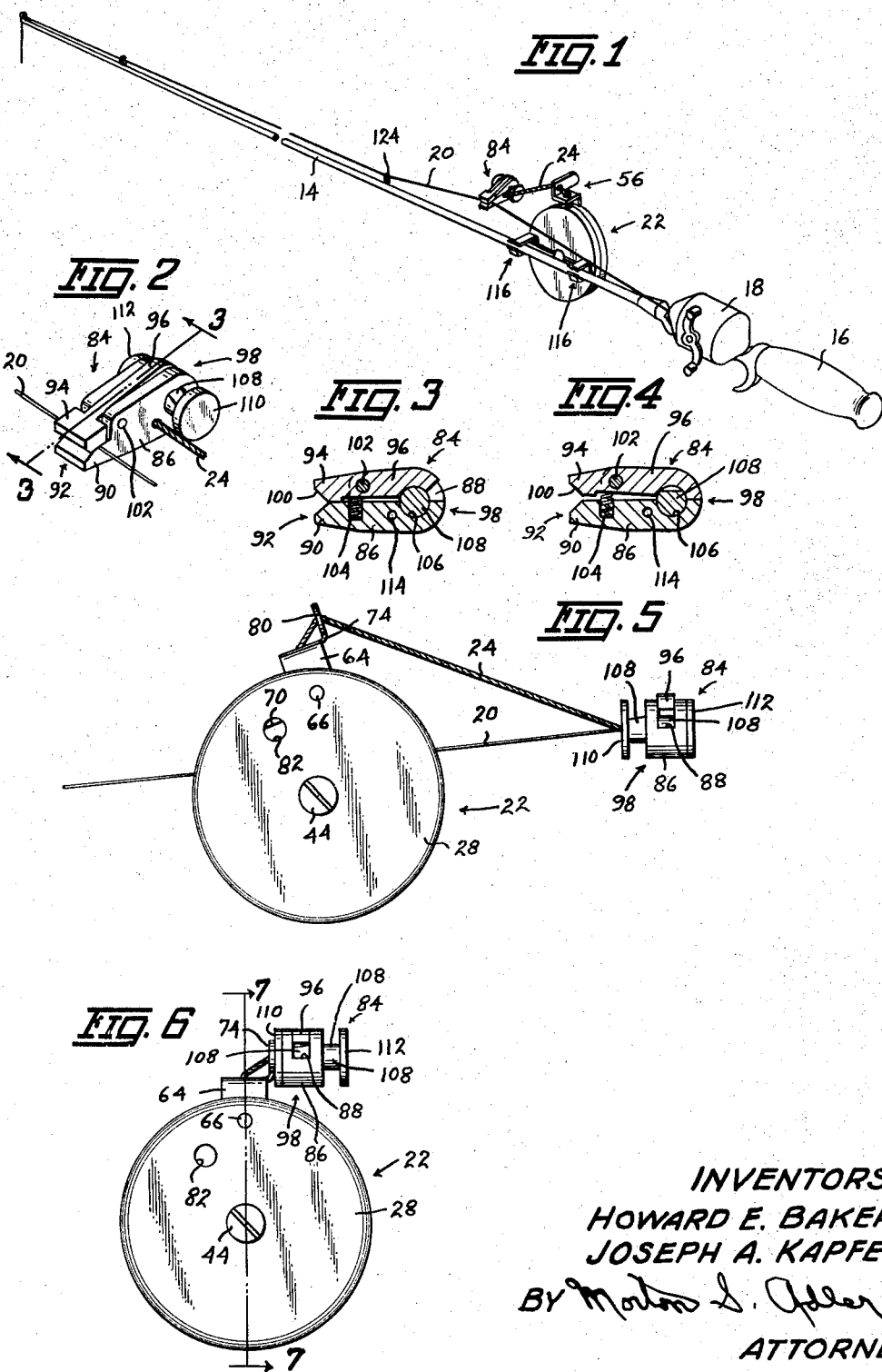
INVENTORS.
HOWARD E. BAKER
JOSEPH A. KAPFER
BY Morton S. Adler
ATTORNEY.

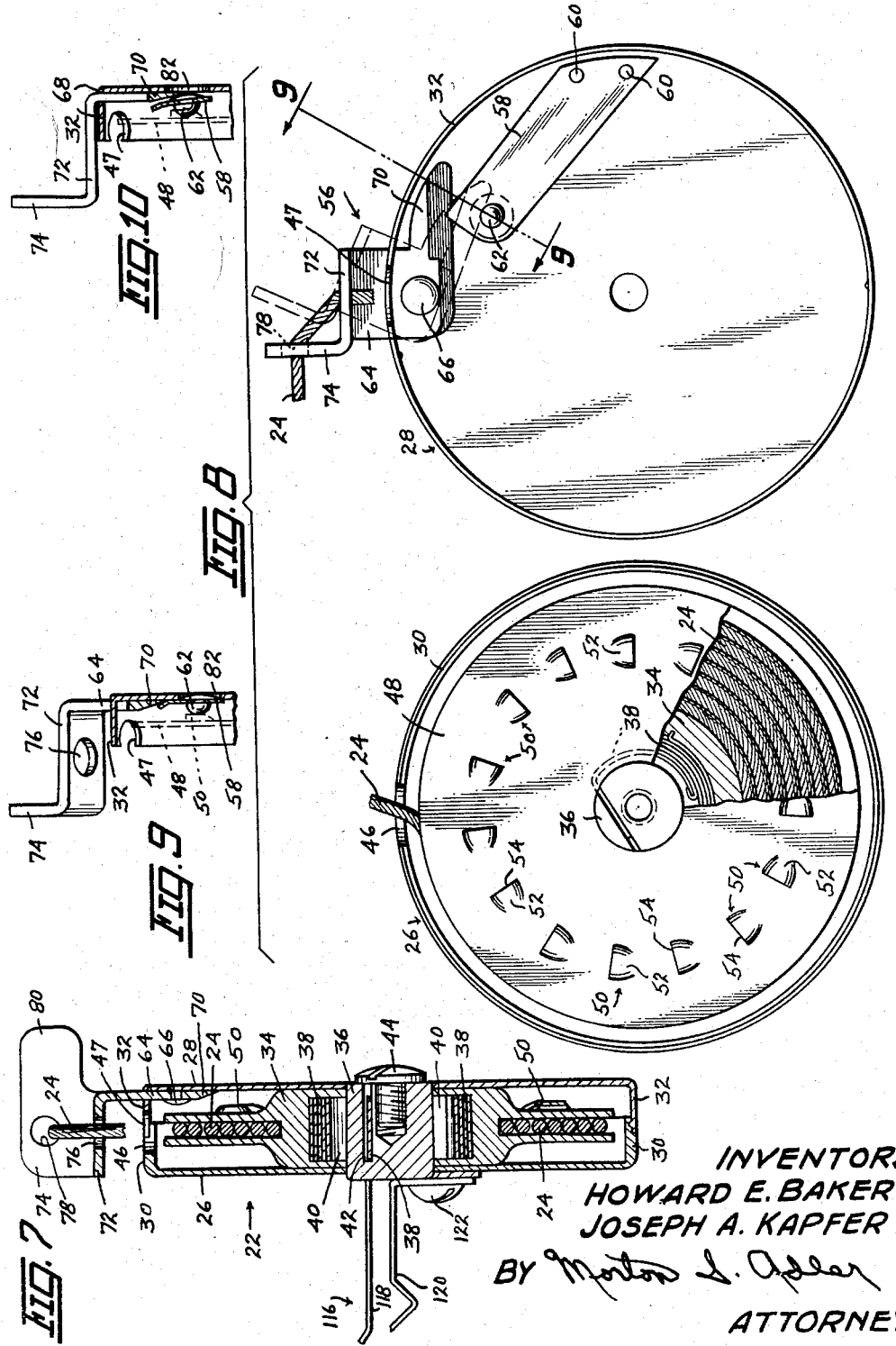

2,913,845

FISHING APPARATUS

Howard E. Baker and Joseph A. Kapfer, Denison, Iowa

Application February 28, 1958, Serial No. 718,374

10 Claims. (Cl. 43—15)

Our invention relates to fishing apparatus and more particularly has to do with means for setting a fish hook when the bait is taken so as to securely hook the fish.

Timing in jerking a fish line is an important factor in hooking the fish before it escapes and it is one of the important objects of this invention to provide improved apparatus usable with a fishing pole and line that automatically jerks the fishing line when the bait is taken.

A further important object is the provision of an automatic fish hook setting device which tightly engages the fishing line for purposes of setting the hook but which includes means automatically releasing the fish line after the hook is set so that the angler can allow the fish to run with the line, reel it in and otherwise fully enjoy the sport of landing the catch after it is hooked.

Another object inhering in this invention is to provide a fish hook setting apparatus of the above class having control means for determining the amount of tension necessary to actuate the same under different circumstances.

Still other objects are to provide fishing apparatus of the character indicated that is compactly constructed, efficient in use, and designed for quick attachment to and removal from any type fishing pole.

Other objects and advantages of this invention reside in the details of construction and correlation of the various parts and will be apparent as the description proceeds.

This invention consists of novel parts and combination of parts to be hereinafter described whereby the objects set forth are attained, as pointed out in the claims, and illustrated in the accompanying drawings, in which:

Fig. 1 is a perspective view showing our invention mounted in working position on a fishing pole, Fig. 2 is an enlarged perspective view of the fish line engaging jaws used with this invention, Fig. 3 is a cross sectional view taken on the line 3—3 of Fig. 2 showing the jaws in closed position, Fig. 4 is a cross sectional view similar to Fig. 3 but showing the jaws in open position, Fig. 5 is an enlarged side elevational view showing this apparatus set for operation relative to a fish line and illustrating a rear view of the jaws in closed position, Fig. 6 is an enlarged side elevational view similar to Fig. 5 but showing the position thereof after actuation and illustrating a rear view of the jaws in open position, Fig. 7 is an enlarged cross sectional view of the reel housing taken on the line 7—7 of Fig. 6, Fig. 8 shows the respective halves of the reel opened and partly broken away to more fully illustrate their construction, and, Figs. 9 and 10 are respective cross sectional views taken on the line 9—9 in Fig. 8 which illustrate the means for adjusting actuation of this apparatus to different degrees of tension.

Referring to the drawings we show in Fig. 1 a fishing pole or rod 14 having a handle 16, fishing line reel 18 and fishing line 20 arranged thereon in a usual manner to illustrate the manner and form of use of our fish hook setting apparatus. Such apparatus includes generally a reel assembly 22 from which a flexible line 24 of any suitable material can be withdrawn and which will be under tension so as to be forcibly retracted unless prevented from doing so. The action of such a reel assembly 22 so far described is well known and while it may be provided in a variety of ways known in the art we have illustrated a preferred structure which has proven most satisfactory in accomplishing the objects above enumerated.

Reel assembly 22 comprises complementary disc shaped shells 26 and 28 having peripheral flanges 30 and 32 respectively by which the same are removably attached to each other in overlapping relationship in a well known manner. A reel 34 is mounted on a hub 36 within shell 30 and carries line 24 wound thereon as shown. A spring 38 attached to an axial opening 40 in reel 34 encircles hub 36 and has one end engaged in a slot 42 formed in the hub. Shell portion 28 when joined to portion 26 (Fig. 7) is also attached thereto by means of a stud screw 44 threadably engaged with hub 36 as shown. Thus far described, line 24 extends from assembly 22 through a notch 46 and 47 formed by complementary notches in flanges 30 and 32 respectively, and the farther line 24 is withdrawn or pulled out, the greater is the tension on spring 38 created by rotation of reel 34 so that line 24 will be quickly rewound when any holding force thereon is released.

Trigger means for holding line 24 in extended position and for releasing the same for retraction into reel assembly 22 is provided as follows. That side of reel 34 which is closest to shell 28 defines a disc plate 48 (Fig. 8) and contains a plurality of spaced projecting lips 50 concentrically disposed relative to hub 36. The lips 50 are punched out so as to present uniformly arranged inclined surfaces 52 extending from the surface of disc plate 48 upwardly to the lip edges 54 which serve as stops as will later appear.

A trigger assembly 56 shown on shell 28 in Fig. 8 includes a resilient spring member or bar 58 secured as by rivets 60 at one end near the perimeter of shell 28 and has a ball or boss 62 on the other end projecting toward plate 48 of shell 26 at a point oppositely disposed from the lips 50. Spring 58 normally lies on the inner surface of shell 28 so that ball 62 is out of contact with lips 50. A trigger member comprises an arm 64 pivotally secured at its lower or inner end by pin 66 to shell 28 within flange 32 at a point spaced from ball 62 and its upper or outer end projects beyond flange 32 through a slot 68 therein. Integral with the inner end of arm 64 is an angularly disposed beveled edge key or cam 70 that moves transversely of ball 62 between the inner surface of shell 28 and the end of spring 58. Thus, the further key 70 is moved toward spring 58 (Fig. 8) the further ball 62 is projected toward lips 50 due to the beveled or cam like surface of the key. Integral with upper end of arm 64 outside of shell 28 is a locking means for line 24 which includes a plate 72 disposed in parallel spaced relationship relative to notch 46 in shell 30 and an upstanding plate 74 integral with one end of plate 72. Plates 72 and 74 are provided with the respective openings 76 and 78 through which line 24 is threaded. Plate 74 may also be provided with a lateral integral extension 80 (Fig. 7). Thus arranged plates 72 and 74 as seen in Fig. 8 present a pair of perpendicularly disposed apertured surfaces through which line 24 is threaded and which when tilted to place key 70 behind ball 62, places the openings 76 and 78 out of alignment sufficiently to cause a binding of line 24 whereby it resists the pull of spring 38. In this respect, as key 70 is moved behind ball 62, such ball engages with one of the lips 50 to hold reel 34 against rewinding and trigger assembly 56 is thus set after line 24 has been withdrawn the desired distance. A tug on the end of line 24 will tilt key 70 out of contact with ball 62 which disengages from lip 50 permitting reel 34 to rewind and thus jerking line 24 quickly back. As key 70 moves away from ball 62, openings 76 and 78 align themselves with slot 46 affording free movement of the line 24. Obviously, the further key 70 is moved behind spring 58, the more tug or force will be required to release reel 34 and this can be adjusted according to the size of fish being sought. To aid in such an adjustment, an opening 82 (Figs. 5 and 6) is placed in shell 28 to indicate the degree of movement of key 70.

Attached to the free end of line 24 is a jaw assembly indicated generally at 84 that constitutes an important feature of this apparatus. This includes an elongated block 86 provided longitudinally of its top side with a groove or channel 88 and having a tapered stationary jaw 90 projecting from its forward end 92. A second jaw 94, movable relative to jaw 90 includes an integral arm extension 96 with such arm 96 being disposed in channel 88 so as to extend to the rear 98 of block 86. Jaw 94 is in juxtaposition relative to jaw 90 for tight abutting engagement therewith at times and is tapered as at 100 so that the two jaws present a V or wedge shaped mouth (Figs. 2-4) to facilitate the placing of a fishing line 20 therein as will be described. Jaw 94 is pivotally mounted relative to jaw 90 by means of a pin 102 located intermediate the forward end of such jaw and rearward end of arm 96 and attached to the sides of channel 88. In this way jaw 94 and its arm 96 will rock on pin 102 within channel 88. In block 86 just rearwardly of jaw 90 and approximately below pin 102 therein is mounted a small coil spring 104 which engages the underside of arm 96 and normally urges it upwardly to hold jaws 90 and 94 in open or spaced position. The urging of spring 104 will rock arm 96 so that the rearward end thereof moves to its deepest penetration within channel 88. The rear 98 of block 86 is provided with a transverse bore 106 communicating with channel 88 and slidably frictionally disposed in such bore 106 is a tapered pin 108 for controlling the open and closed position of jaws 90 and 94 and which has the respective integral heads 110 and 112 on opposite ends for engagement with respective opposite outer sides of block 86 as shown in Figs. 5 and 6. With pin 108 moved in one direction transversely of block 86, its widest diameter will occupy part of channel 88 to bear against arm 96 and urge jaw 94 into closed position with jaw 90 against spring 104, and when it is moved in the opposite direction, its smaller diameter will be within channel 88 to allow room for arm 96 to move whereby jaws 90 and 94 are opened from tension of spring 104. Block 86 of jaw assembly 84 is provided with a small transverse hole 114 through which the free end of line 24 is passed from one side and suitably secured on the opposite side as by knotting.

This apparatus when constructed as described will operate in the following manner. Reel assembly 22 is provided with a pair of projecting spaced clip members 116, each of which comprises two spaced arms 118 and 120. Arm 120 is adjustable toward and away from arm 118 by screw means 122 whereby clips 116 can be frictionally attached to practically any size fishing pole 14 as shown in Fig. 1. Preferably reel assembly 22 is attached to pole 14 just forwardly of reel 18. With the fishing line 20 extended to the anglers' desired position, line 24 of our apparatus is withdrawn and trigger assembly 56 set as described so that jaw assembly 84 will reach to a point rearwardly of the innermost eyelet 124 on rod 14. Fishing line 20 is then passed between jaws 90 and 94 which is facilitated by the tapered mouth described, and pin 108 is pushed toward the trigger assembly 84 (Fig. 5) so its larger diameter bears against arm 96 whereby jaws 90 and 94 are tightly locked together on the fishing line 20. Thereafter when a fish tugs on line 20, trigger assembly 56 is automatically tripped causing reel 34 to rewind and jerking jaw assembly 84 rearwardly which of course jerks line 20 to set the hook. The jaw assembly 84 is retracted into contact with the trigger assembly 54 which serves as a stop therefor and such contact is between head 110 of pin 108 with trigger plate 74 and its extension 80. The force of such contact moves pin 108 through block 86 to the position shown in Fig. 6 where the smaller diameter of pin 108 occupies channel 88 allowing jaws 90 and 94 to open under tension of spring 104 and thus free line 20 from any holding force. In this way the setting of the fish hook is not dependent on human reaction and at the same time, once the hook is set, the fishing line is free to be manipulated in landing the catch as in the usual manner.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

We claim:

1. A fish hook setting device for use with a fishing rod and line, comprising a reel assembly, means for detachably mounting the same to a fishing rod, a second line associated with said reel assembly adapted to be unwound therefrom, spring means within said reel assembly normally urging said second line to retracted position, a trigger assembly mounted on said reel assembly and engageable with said second line to hold the same against retraction by said spring means, said trigger assembly responsive to a pull on said second line to release its hold on said second line whereby said second line is abruptly retracted, a jaw assembly on the free end of said second line adapted to tightly engage a fishing line at times, and means on said jaw assembly engageable with said trigger assembly when said second line is retracted to release said jaw assembly from engagement with the fishing line.

2. A fish hook setting device for use with a fishing rod and line, comprising, a spring wound second line normally urged by spring tension to wound position, fishing line clamping jaws on the outer end of said second line, control means on said jaws to selectively hold them in open and closed position, trigger means associated with said second line to hold it in selective unwound positions, said trigger means responsive to a pull on said second line to release the same for return to its wound position, and said control means engageable with said trigger means when said second line is returned to wound position to place said jaws in open position.

3. A fish hook setting device for use with a fishing rod and line, comprising, a spring wound second line normally urged by spring tension to wound position, fishing line clamping jaws on the outer end of said second line, said jaws comprising a block member having a first jaw integral therewith, a second jaw pivotally disposed on said block member and engageable with said first jaw at times, spring means in said block member engageable with said second jaw to normally urge it out of engagement with said second jaw, cam means in said block member engageable with said second jaw and movable to pivot said second jaw into engagement with the first against said spring means, trigger means associated with said second line to hold it in selective unwound positions, said trigger means responsive to a pull on said second line to release the same for an abrupt return to its wound position, and said cam means engageable with said trigger means when said second line is returned to wound position whereby said cam means is moved out of engagement with said second jaw which correspondingly moves out of engagement with said first jaw.

4. An automatic fish hook setting device, comprising a first line, spring means normally urging said first line in one direction, trigger means to hold said first line against movement at times, said trigger means responsive to a pull on said first line for releasing the same, fishing line clamping jaws on one end of said first line, control means to selectively hold said jaws in open and closed position, and said control means moved into contact with said trigger means after it releases said first line whereby said jaws are held in open position.

5. An automatic fish hook setting device, comprising a first line, spring means normally urging said first line in one direction, trigger means to hold said first line against movement at times, said trigger means responsive to a pull on said first line for releasing the same, fishing line clamping jaws on one end of said first line, control means to selectively hold said jaws in open and closed position, said control means moved to hold said jaws closed when said first line is held by said trigger means against movement, and said control means moved by said first line into contact with said trigger means after said trigger means releases said first line whereby said jaws are held in open position.

6. An automatic fish hook setting device, comprising, a pair of jaws having an open and closed position and adapted to tightly engage a fishing line when closed, a second line attached at one end to said jaws and at the other end to a spring wound reel for normally urging said jaws in one direction, means holding said second line immovable at times and said means responsive to a pull on said jaws for releasing said second line, and means moving said jaws to open position after a predetermined length of movement with said second line.

7. An automatic fish hook setting device, comprising, a pair of jaws having an open and closed position and adapted when closed to tightly engage a fishing line on a fishing rod, pulling means adapted for mounting on a fishing rod and connected to said jaws to normally move them in one direction toward the handle end of the fishing rod, a trigger engageable with said pulling means to render the same ineffective at times, said trigger responsive to a pull on said jaws for disengaging said pulling means, and means moving said jaws to open position for releasing the fishing line at a predetermined interval after said trigger has become disengaged from said pulling means.

8. In combination with a fishing pole and fishing line thereon, a fishing line engaging means constructed and arranged to abruptly jerk said fishing line responsive to a pull on the same, and means adapted for automatically releasing said fishing line engaging means from said fishing line at a predetermined interval after said line has been abruptly jerked.

9. Fishing line clamping jaws, comprising a block member having a first jaw integral therewith, a second jaw pivotally disposed on said block member and engageable with said first jaw at times, spring means in said block member engageable with said second jaw to normally urge it out of engagement with said second jaw, cam means in said block member engageable with said second jaw, and said cam means movable in one direction to pivot said second jaw into engagement with said first jaw against said spring means and movable in another direction whereby said second jaw is moved out of engagement with said first jaw by said spring means.

10. An automatic fish hook setting device, comprising, a pair of jaws having an open and closed position and adapted to tightly engage a fishing line when closed, a second line attached at one end to said jaws and at the other end designed for attachment to a means for normally urging said jaws in one direction, means holding said second line immovable at times and said means responsive to a pull on said jaws for releasing said second line, and means automatically moving said jaws to open position after a predetermined length of movement with said second line.

No references cited.